United States Patent [19]

Haerle

[11] Patent Number: 5,009,857

[45] Date of Patent: * Apr. 23, 1991

[54] FILTER FOR GASES

[75] Inventor: Hans A. Haerle, Bopfingen, Fed. Rep. of Germany

[73] Assignee: Schwaebische Huettenwerke GmbH, Fed. Rep. of Germany

[ * ] Notice: The portion of the term of this patent subsequent to Nov. 20, 2007 has been disclaimed.

[21] Appl. No.: 309,323

[22] Filed: Feb. 10, 1989

[30] Foreign Application Priority Data

Mar. 10, 1988 [DE] Fed. Rep. of Germany ....... 3807917
May 30, 1988 [DE] Fed. Rep. of Germany ....... 3818281

[51] Int. Cl.$^5$ ..................... B01D 53/36; B01D 39/10
[52] U.S. Cl. .................................. 422/180; 422/177; 55/523; 60/311
[58] Field of Search ............ 422/177, 179, 180; 55/523; 502/527; 60/311

[56] References Cited

U.S. PATENT DOCUMENTS

| | | |
|---|---|---|
| 3,161,478 | 12/1964 | Chessin . |
| 3,306,353 | 2/1967 | Burne . |
| 3,904,551 | 9/1975 | Lundsager et al. .................. 422/180 |
| 4,062,807 | 12/1977 | Suzuki . |
| 4,064,914 | 12/1977 | Grant . |
| 4,329,162 | 5/1982 | Pitcher, Jr. ............................ 55/523 |
| 4,515,758 | 5/1985 | Domesle et al. ....................... 60/299 |
| 4,652,286 | 3/1987 | Kusuda et al. ......................... 55/523 |
| 4,662,915 | 5/1987 | Shirai et al. ............................ 55/523 |
| 4,683,872 | 8/1987 | Fricker . |
| 4,687,579 | 8/1987 | Bergman ............................... 55/523 |
| 4,732,593 | 3/1988 | Kondo et al. .......................... 55/523 |
| 4,758,272 | 7/1988 | Pierotti et al. ........................ 55/523 |
| 4,760,047 | 7/1988 | Jeschke et al. ....................... 502/527 |
| 4,889,630 | 12/1989 | Reinhardt et al. . |

FOREIGN PATENT DOCUMENTS

| | | |
|---|---|---|
| 42301 | 6/1980 | European Pat. Off. . |
| 1453653 | 11/1965 | France . |
| 2462188 | 2/1981 | France . |
| 54-128842 | 5/1979 | Japan . |
| 54-152241 | 11/1979 | Japan . |
| 61-287451 | 6/1985 | Japan . |
| 62-225221 | 3/1986 | Japan . |

Primary Examiner—David L. Lacey
Assistant Examiner—D. John Griffith, Jr.
Attorney, Agent, or Firm—Welsh & Katz, Ltd.

[57] ABSTRACT

A filter is disclosed for treating a gaseous stream to remove therefrom undesirable components, especially from exhaust gases of engines, and particularly from internal combustion engines, such as, for example, Diesel engines and the like. The filter includes a filter body or element having a plurality of inlet and outlet channels, with the inlet channels being separated from the outlet channels by walls or partitions to provide reaction chambers. The filter body is made a high-temperature-resistant, sintering material, and can be made of metal wire or metal chips which are compacted and subsequently sintered.

13 Claims, 2 Drawing Sheets

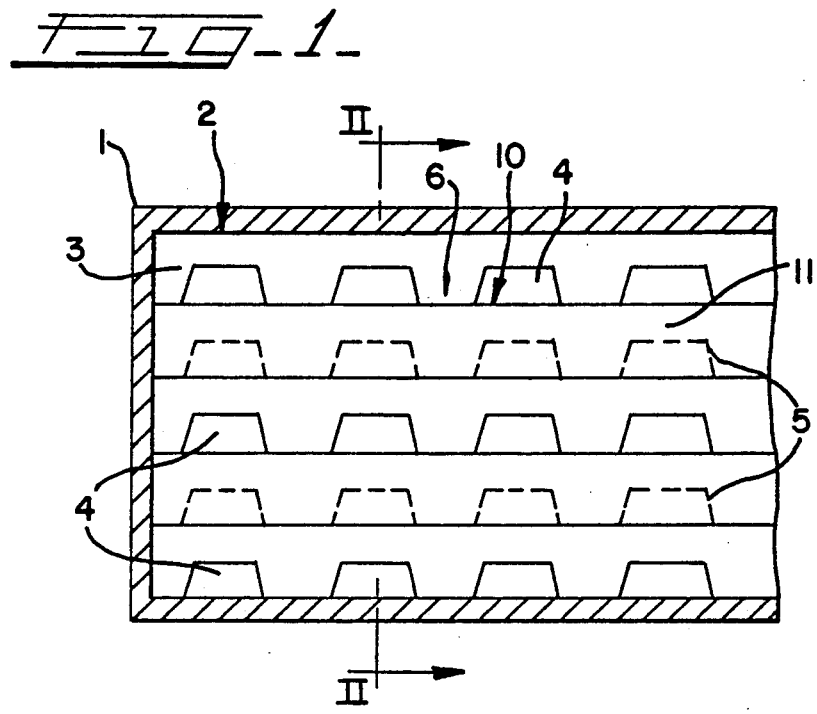
FIG_1_
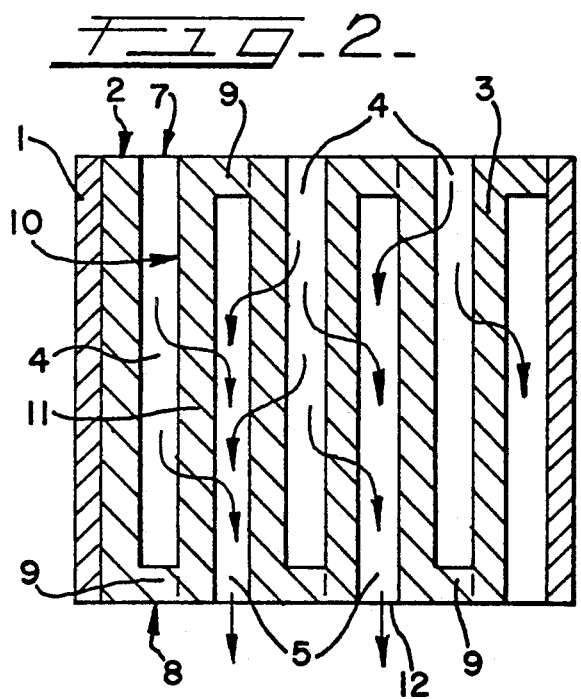
FIG_2_
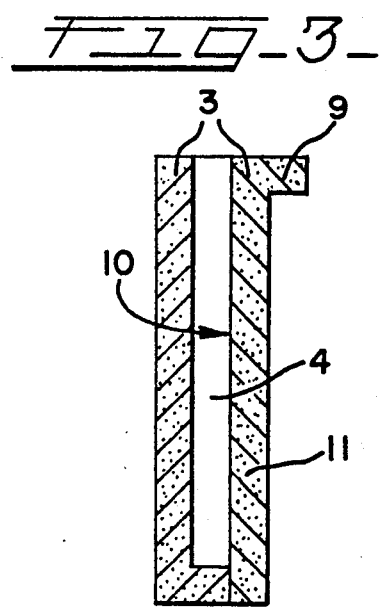
FIG_3_

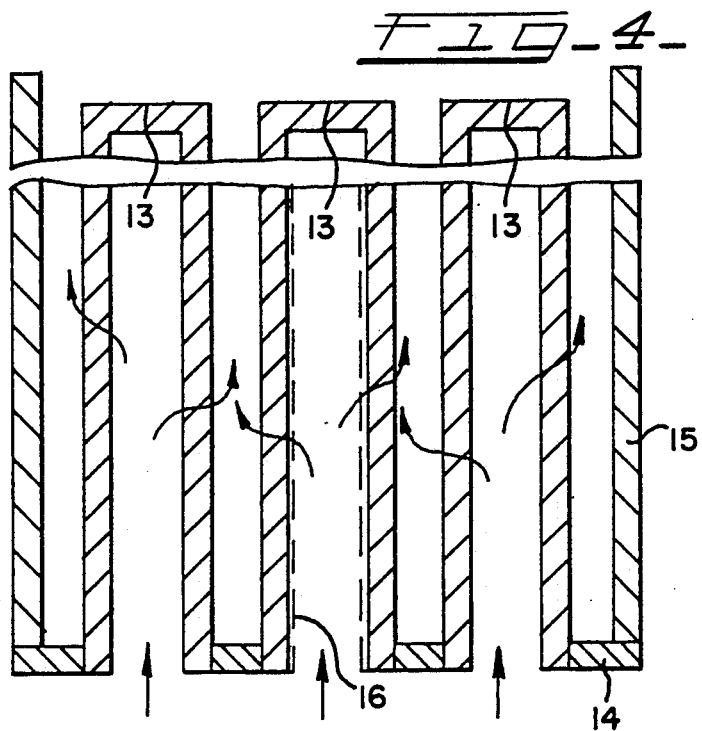
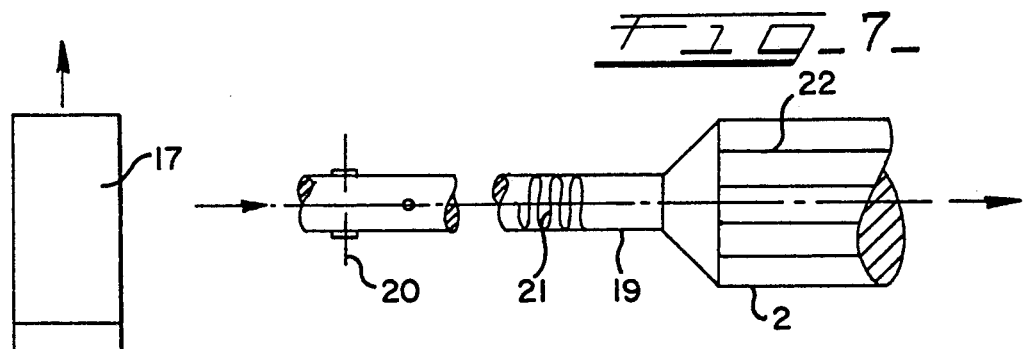
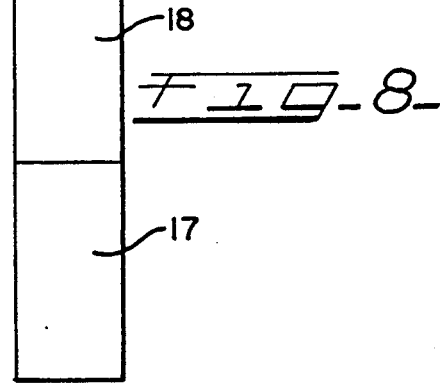
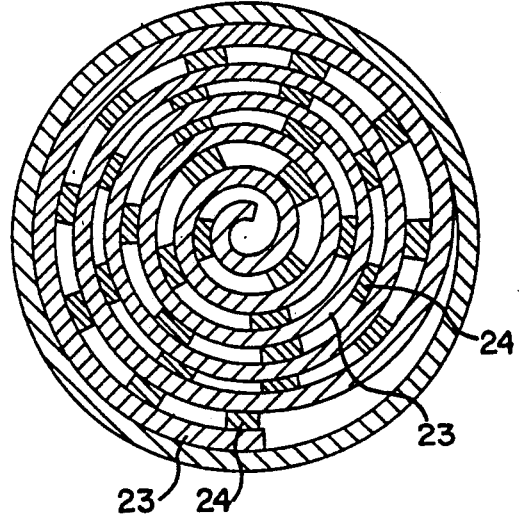
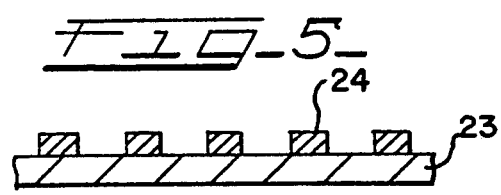

FILTER FOR GASES

BACKGROUND OF THE INVENTION

The present invention relates to a filter for treating gases to remove undesirable components therefrom, especially from exhaust gases of engines, and particularly internal combustion engines, such as, for example, Diesel engines, and the like. The filter includes a filter body or element having a plurality of inlet and outlet channels, with the inlet channels being separated from the outlet channels by means of walls or partitions which define reaction chambers.

With respect to removal of, for example, soot and the like deleterious substances from exhaust gases, particularly in reference to Diesel engines, soot filters made of ceramic material are known. In such applications, the soot filter is generally positioned in the exhaust duct or pipe system of the internal combustion engine and downstream of the exhaust manifold.

The hot gases emanating from the engine flow into the inlet channels of the filter body or element, pass through the porous filter walls which surround the inlet channels, and they are subsequently emitted by means of the respective outlet channels.

Due to high temperature conditions, the soot, i.e., carbonaceous matter, is converted in the filter walls into gaseous matter and ash, and these are emitted together with the exhaust gas from the exhaust duct.

A particular detriment of ceramic filters resides in their particular porosity, especially the pore size distribution and the spherical pore configuration, which determines separation of soot but also limits soot separation. A substantial change of the porosity is precluded, however, by the special structural characteristics of the ceramic material.

Ceramic filters have other drawbacks. They are particularly sensitive to rapid changes in temperature, localized over-heating by exhaust gases due to poor thermal conductivity, and against shocks and blows or the like impact stresses. This means that the filter body must be exteriorly surrounded by a material which is protecting or insulating with respect to temperature and shock, generally stone wool, and this insulating material, in turn, is enclosed by a housing. Thus, the known soot filters occupy a considerable space and in consideration of oftentimes experienced limited space availability, problems are experienced in the engine compartment of a motor vehicle.

The drawbacks of ceramic filters are also apparent in any recycling, when such filters are coated with catalytically acting or active metals, such as, for example, platinum, rhodium, vanadium and palladium. These metals need then to be recovered with laborious methods during requisite recycling from the ceramic body. In addition, the serviceable life of such ceramic bodies is limited due to stresses, and this problem represents a considerable cost factor which needs to be addressed during manufacture and ultimate sale of such ceramic bodies.

Also known are exhaust gas catalysts which by catalytic action remove further deleterious components such as, for example, carbon monoxides, hydrocarbons, and nitric oxides from the exhaust gas. For this purpose one uses, for example, filters with coatings of platinum, rhodium, vanadium, and other catalytically acting materials. Such filters which are based on ceramic materials, however, are expensive and, furthermore, sensitive to operating conditions.

SUMMARY OF THE INVENTION

It is an object of the present invention to provide a filter of the type described in the foregoing which precludes the mentioned drawbacks and which is particularly robust, and the filter body or member configuration of which can be readily varied.

In accordance with one aspect of the invention there is provided a filter which comprises a filter body or element of a high-temperature-resistant, compacted/molded/sintered material.

The filter element according to the invention made of sintered parts is relatively insensitive to temperature shocks and impacts such as blows or strikes. A further substantial advantage in comparison to known filter elements resides therein that the material can be arranged in any desired configuration. This means that the filter is optimally adaptable to available space situations. Thus, for example, square, rectangular or oval configurations, as well as other desired configurations, are possible.

A further advantage of the filter element according to the invention resides therein that it has a relatively high thermal conductivity and also a large internal surface area, whereby the gasification of the soot particles is enhanced due to a better distribution thereof on the individual fibres.

The large surface area of the filter, combined with a good thermal conductivity, caused by bridge-like partial sintering, assures a uniform temperature distribution in the filter, such that combustion of separated carbon is achieved also in the event of relatively low temperatures over the entire volume in substantially uniform manner, and with pressure fluctuations being substantially precluded in the filter.

The large surface area of the filter, furthermore, in addition to the stated advantages, affords full utilization of the catalyzing action or effect, and conversion of the solid soot into gaseous products proceeds at lower temperature as heretofore known.

On the basis of the described advantages, the filter according to the present invention has a particularly high efficiency.

Especially when compared with known ceramic filters the following benefits are at hand.

By randomly superimposed-layered metal fibres, which are subsequently sintered at their contact locations or surfaces, a very large surface area is obtained at good thermal conductivity, i.e., excellent temperature distribution. The soot filter is accordingly heated in very rapid and uniform manner.

Thus, it was found, for example, that soot conversion, or soot-gasification, respectively, can occur at temperatures of from about 250° to 300° C. Subsequently, at approximately 350° to 400° C. a soot conversion of 50% is experienced, and at approximately 600° to 680° C. a substantially complete soot conversion has been attained. Surprisingly in this is the rapid increase of the effectiveness in the lower temperature range.

In comparison herewith, soot conversion arises in the known filters only at a temperature above 400° C., and 50% soot conversion is attained only at a temperature in the range of from approximately 500° to 600° C. Substantially complete soot conversion arises with the prior art filters generally at temperatures in excess of 750° C.

The greater efficiency is particularly of advantage for vehicles with Diesel engines which are frequently used for shortdistance hauls, i.e., operate substantially with a cold engine, and under such usage customary ceramic filters are nearly totally ineffective.

The elimination of parts which are needed to protect the known sensitive ceramic structures or bodies, such as, for example, stone wool, intermediate mantles and the like, furthermore, makes the filter in accordance with the invention simpler and more economical in production.

One merely has to ensure that the material of construction of the filter body has a sufficiently high melting point, i.e., corresponding heat-resistant materials are used.

Surprisingly, it has been found that the inventive exhaust gas filter has a strong sound-attenuation or damping capability.

For this reason in a further embodiment of the invention the filter is at least in part shaped as a muffler.

Since the filter body can be produced in simple and practical manner, substantially without problems, and can be produced in various configurations, while retaining its effectiveness to clean exhaust gases, it can be shaped in such a way that at least parts of the hitherto known muffler designs or structures, such as, for example, the initial or pre-muffler can be replaced by it.

Thus, the filter according to the invention fulfills a further object or purpose. In the case of a corresponding configuration of the filter body, a specific muffler arrangement can be eliminated, representing of course a pronounced savings of costs in comparison with the hitherto known methods and devices.

Advantageously, one can sinter (join or compact) the steel container to the molded/compacted parts, or sintered parts, respectively. In this manner one obtains a compact unit and a soot filter which due to its homogeneity and unity is able to withstand high stressing or loads.

The molded parts can include high-temperature-resistant alloy steel powder with, for example, chromium and/or molybdenum, manganese, cobalt and nickel as alloying components.

In this manner high temperature resistance and stability of the filter body are attained.

It is furthermore feasible to utilize the catalytic action of the filter for conversion of other deleterious components in the exhaust gas, such as, for example, carbon monoxides, hydrocarbons and nitric oxides. Thus, advantageously, the utilization options or applications of the filter are increased.

In order to remove in controlled manner, aside from soot, other environmentally unacceptable or poisonous components, advantageously, one can also equip the filter of the invention with catalytically acting or active materials. Thus, the sintered parts can be coated with platinum, rhodium, vanadium, palladium, or the like, whereby additionally carbon monoxides, hydrocarbons and nitric oxides can be removed from the exhaust gas.

A very advantageous and inventive embodiment of the invention resides therein that the filter body is comprised of metal wire or metal chips which are formed or compacted in a mold and subsequently sintered.

In the manufacture of a sintered body of metal wire or metal chips a structure having a low density at high material solidity/strength is attained. This means that sintered parts produced in this manner have a large capacity for infiltrations or flow-through, and this makes them yet better suited for respective applications.

The metal wire pieces or metal chips can have diameters or widths, respectively, of 0.1 to 5 mm and lengths of from approximately 0.5 to 30 mm, preferably of from 1 to 3 mm, and 2 to 10 mm, respectively. As well, one or several correspondingly long metal wires can be arranged in a mesh or similar woven or interconnected arrangement. Thus, joining of the respective material of construction can include electrical welding and the like methods to achieve a structure which has the properties of the sintered body. The relative resistance of flow-through is then substantially lowered.

In accordance with another embodiment, the filter body is made of several identical molded or compacted parts, which in combination provide the filter body or element.

When the filter is made of several identical molded parts it can be assembled in accordance with the attendant demands and the required size in an interlocking or block-type manner, whereby corresponding simplification and lowering in manufacturing costs are attained.

The compacted/molded parts can be sintered individually and subsequently assembled, or they can be sintered together upon forming to attain a monolithic filter body for provision of a substantially solid and homogeneous filter unit.

The manufacture of a sintered filter body affords a wide selection of configurations and shapes of the channels, and these can be optimally suited to the respective conditions and requirements.

The parts can include rows of channels which in accordance with their arrangement either provide inlet channels or outlet channels. The respective configuration of the channels, however, can be as desired. Thus, various geometries for inlet channels, at which the soot is deposited, and for outlet channels can be selected. This means that the filter can be optimally adapted to the demands made of it.

In a very advantageous embodiment of the invention, each molded part is comprised of a plate having several channels which are formed in a longitudinal wall of said plate and separated from one another by cross-pieces, whereby the channels for provision of an inlet or outlet opening, respectively, are open at one front side and closed by means of transverse cross-pieces at the opposite front side.

This configuration practically entails only a single shaped part, whereby in accordance with a particular array or sequential arrangement of the individual plates, each plate can be used at the inlet as well as at the outlet.

Of course, many other variations in shape and configuration of the filter body are available within the scope of the invention.

Desired shaping can be done in practical manner and without problems. Thus, it is, for example, also possible to produce a filter body which is comprised of one or several meandering or spirally wound bands or strips of sintered metal, and such ribs, beads or cross-pieces of the meander-configuration, which are arranged at a distance and parallel with respect to one another, provide respective inlet and outlet channels.

In a further embodiment of the invention one can provide several filter cartridges alongside one another and/or sequentially when considered in the direction of flow, and through which pass exhaust gases, respectively from the exterior to the interior and vice versa.

This embodiment provides the advantage that with it furthermore an easier replacement or exchangeability of individual elements is attained, as may be necessary through the operational loss on damage, plugging, and the like.

Instead of coating the sintered parts with a catalytically acting material, in a further and very advantageous embodiment of the invention, into the filter body can be inserted a body made at least in part of catalytically active or acting material of the type mentioned above, or which is coated with such material, and which is slid into the one or several filter bodies, or arranged—when considered in the direction of flow—either upstream or downstream thereof.

The material can be made of metal wires which, for example, extend axially into or through the filter body. They can be arranged in circular fashion and, for example, slid from the forward end into the filter body. Upon consumption or depletion, the wires can be replaced, as required, in a regular maintenance cycle for the vehicle.

Alternatively, the catalytic material or a substrate coated with catalytic material, in the shape of a wire mesh, pins, and rods, can be arranged upstream or downstream of the filter body in the path of the exhaust gas. In this manner, the hot exhaust gases can remove catalytic material and this can be deposited in the filter body in the soot layer where it can be catalytically active. In this manner it is precluded that the catalytic action is diminished as the soot layer is increased. Also in this embodiment, the spent catalytic material can be easily checked by maintenance personnel and be replaced as required, with replacement being easily achieved.

A very advantageous embodiment of the invention resides therein that the filter bodies are arranged in combination with other known soot and/or filters for exhaust gas of known structure. Thus, for example, in special cases the filter bodies according to the invention can be combined with, say in sandwich manner, ceramic filters, in desired combinations.

The following gives examples of embodiments of the invention with reference to the drawings which show respective embodiments in a generalized manner to show underlying principles.

BRIEF DESCRIPTION OF THE DRAWINGS

FIG. 1 shows a part of a top plan view of a filter according to one embodiment of the invention;

FIG. 2 is a cross-sectional view along the line II—II in FIG. 1;

FIG. 3 shows two individual molded parts in a lateral section;

FIG. 4 is a side elevation of part of a filter body of another embodiment of the invention;

FIG. 5 is a starting material for a filter body of another construction;

FIG. 6 shows a helically wound body according to FIG. 5 in schematic representation;

FIG. 7 is a side elevation of a filter body for catalytic utilization; and

FIG. 8 shows several head-to-toe arranged filters, also in schematic representation.

DESCRIPTION OF PREFERRED EMBODIMENTS

The filter according to FIGS. 1 to 3, which in this embodiment is only represented in exemplifying manner, has a steel-sheet gas-impermeable container 1 as shroud or envelope for a filter body 2, which filter body 2 is made of several parts or plates 3 as formed or shaped parts.

The shaped parts 3 are sintered parts. Each shaped part 3, respectively, each plate, has several channels (4,5) which are formed in a longitudinal wall which in accordance with their arrangement either provide a row of inlet channels 4 or a row of outlet channels 5. The channels extend parallel with respect to the longitudinal edges of the plates 3 and have a depth which corresponds approximately to one-half the width of a respective plate 3, whereby the channel-separating cross-pieces 6 have approximately the same width as the channels 4 and 5. As clearly seen in FIGS. 1 and 2, each inlet channel 4 is in longitudinal (vertical) alignment with a plurality of outlet channels 5, and each outlet channel 5 is in longitudinal or vertical alignment with a plurality of inlet channels 4.

The filter can be used for removal of undesirable components from exhaust gases, especially from exhaust gases of combustion engines, internal combustion engines, such as, for example, Diesel engines. The inlet channels 4 are separated from the outlet channels 5 by means of walls or partitions 10 which define reaction chambers. The filter body 2 can include a high-temperature-resistant, compacted/molded/sintering material.

The plates 3 can include high-temperature-resistant alloying components, such as, for example, chromium, molybdenum, nickel and manganese. As well, the filter can include alloying components at least in part include catalyzing components, such as, for example, chromium, platinum, rhodium, vanadium, palladium, molybdenum, nickel, copper or manganese.

As can be seen in FIGS. 2 and 3, the channels 4 are open at one end face 7 while they are closed at the other end face 8 by a closing cross-piece 9. Similarly, the channels 5 are open at the end face 8, while they are closed at the other end face 7 by a closing cross-piece 9.

Gases are passed through the filter according to the present invention in the direction of the arrows in FIG. 2. As is further evident from FIG. 2, the open sides of the channels 4 and 5 are provided by a longitudinal wall or surface 10, or respectively that rearward wall or surface which is opposite to that wall with the longitudinal channels 4 and 5 respectively, and the channels are closed by neighboringly arranged plates 3. In this manner there is accordingly provided a closed channel system the ends of which opposite the inlet side are respectively closed by transverse closing cross-pieces 9.

As can be seen with reference to the arrows in FIG. 2, the exhaust gases flow through the inlet passages or openings 7 into the inlet channels 4 and permeate the porous filter walls 11 of the plates 3 because the lower ends of the inlet channels 4 are closed by the cross-pieces 9.

In the filter walls 11 occurs the chemical reaction of the soot or its conversion, respectively, into gas and ash. From the filter walls 11 the purified exhaust gases are passed into the exit channels 5 which have their exit passages or openings 12—as indicated in FIG. 2—at the lower terminus, with the inlet side also being closed by cross-pieces 9.

The number of the plates 3 arranged alongside one another can be as desired. This applies to the number of the channels 4 and 5 arranged alongside one another in an alternating longitudinal alignment as shown in FIGS. 1 and 2, and thereby also to the lengths of plates 3.

As is furthermore shown in FIGS. 2 and 3, all plates or form parts 3 are substantially indentical in shape or configuration, whereby respectively only in accordance with the arrangement of the individual plates with respect to one another inlet channels 4 and exit channels 5 are created.

The separating lines at which the plates or sintered parts 3 are joined to one another during sintering are shown in dash outline, whereas FIG. 3 shows two parts prior to sintering.

As can best be seen with reference to FIG. 3, adjacently arranged plates 3 are respectively rotated through 180° or arranged in a head-to-toe arrangement. Respectively one rearward side or surface 10 of a part 3 is positioned at the forward or toe end of the neighboring cross-piece 9 and/or the respective cross-pieces 6.

The manufacture of the filter in accordance with the present invention is carried out in such manner that the identical plates or form parts 3 are compacted into the desired shape in a compacting press. Subsequently, they are arranged in the desired attitude head to toe, and number along one another and sintered together.

In this manner is produced a monolithic filter body 2.

Subsequently, or simultaneously with sintering parts 3 in this manner to produce the monolithic filter body 2 for a correspondingly stabile and dense connection between the steel sheet container 1 and the body 2, the container 1 can be sintered to the respectively outer surfaces of the sintered plates 3 of the monolithic body 2. For this to be accomplished it is only necessary to provide for a sufficient amount of sintering powder having a low melting point, so that the connection between the form parts 3 and the steel sheet metal container 1 is achieved.

The parts 3 can be made of a high-value alloy steel powder or of corresponding heat resistant and high-value metal wire or metal chips which are sintered in the same manner as metal powder.

FIG. 4 shows a further embodiment of a filter for exhaust gas according to the invention. This embodiment comprises several individual hollow-cylindrical filter cartridges 13 arranged alongside one another and/or when considered in the direction of the flow sequentially, and which are preferably arranged in circular array and in several rows. The cartridges 13 are open at one end, i.e., the inlet side, and closed at the opposite end. They can together, as required, be replaced and be secured at or on, respectively, a base plate 14. A shroud-type wall 15 encloses the filter to the exterior.

As can be seen, the exhaust gases to be cleaned enter the cylindrical cartridges 13 at the open ends thereof, flow or permeate the enveloping walls thereof, and exit in purified manner at the opposite end.

When the filter cartridges 13 are coated with a catalytic material at one surface or wall, preferably the interior circumferential wall, as required, aside from the combustion of the soot parts a conversion of further deleterious exhaust gases is achieved. The dash line "16" in FIG. 4 indicates this embodiment. Of course, the coating can be done at another location.

In FIGS. 5 and 6 is indicated an example of a further embodiment and again this is only schematically shown to give the principle of the operation. On a base body 23 of sinter-material are arranged at uniform-intervals cross-pieces 24.

The strip with the cross-pieces 24 is then coiled in helical or meandering manner, whereby the formed exit and inlet channels are respectively closed at one front face. When the cross-pieces 24 are also made of sinter material all parts can be sintered together for their respective ultimate condition or configuration.

FIG. 7 shows the configuration of a filter body 2 with an insert of several catalytically acting materials and again the principle is indicated primarily. In the gas inlet conduit 19 leading to the filter body 2 are arranged several pins 20 of a catalytic acting material of construction or of a base body which is coated with a catalytically acting material of construction.

The hot gases can wear down the catalytic material on the pins 20 and this removed material is deposited in the filter body 2 at the walls so that it can there impart its action. In place of, or in addition to, the pins 20 in the gas inlet conduit 19 there can be arranged a mesh or woven arrangement 21 of a catalytic acting material or a material coated with such a catalytic material or mass, which would satisfy the same purpose.

In place of, this, one can directly slide into the filter body metal wire shapes 22 which are fully or partially made of a catalytically acting material of construction, or are coated with this, respectively. They can be slid-in from one end face, preferably from that end or side which corresponds to the inlet side, in axial direction. As required, several wires 22 can be arranged in circular manner. In this way, the wires 22 can be readily replaced upon a corresponding depletion or wear.

The type and configuration of the wires 22 can be as desired and will depend on the respective application situation. For purposes of simplification in FIG. 7 all described solutions are shown with a catalyst insert. Of course, inserts are feasible individually or in modified shapes.

Instead of the embodiment of a filter body comprised of plates, as shown in FIGS. 1 to 3, or by one or several hollow cylindrical filter cartridges, they can be shaped in such a way that in operation a sound muffling or attenuation is achieved. One only has to establish that for conversion or removal, respectively, of deleterious components from the exhaust gas, a sufficiently long path and adequate residence times are provided, whereby the sound muffler and filter for exhaust gas or gases also need to be co-ordinated with respect to one another.

The filter body in accordance with the invention can be used as required also in combination with other known catalysts for exhaust gas or gases. This provides for various options.

As shown in FIG. 8, for example, several filters (17, 18) can be serially arranged one behind the other, whereby, for example, the first one is a filter which primarily serves to combust the soot, while the second filter 18 can be a ceramic filter. The pattern of the sequencing can be as desired. Of course, the filters can be configured in such a way that they are arranged within a housing made of different materials of construction, such as for example, the sintered parts according to the invention and ceramic plates.

In such an embodiment, the joining between a respective plate or a sinter part, and ceramic plate or metal plate, for example, can be done in such a way, that metal cam-portions extend through apertures in the ceramic plate for achieving the connection to respectively adjacent metal plates. Subsequently, the entire sandwich is sintered or soldered.

As well, an arrangement is possible whereby tubes made of metal fibres or ceramic material, respectively, and concentrically positioned within one another are sintered together in such a way that a corresponding close connection is achieved. One only has to ensure that the connection is sufficiently secure such that the ceramic plates do not move within the metal plate structure or frame work and are secure against vibrations of the vehicle.

The securement of the filter with respect to the housing is achieved advantageously by way of metal fibre or sinter plates, respectively.

Of course, the filter according to the invention is not only suited for the removal or conversion of gases arising in combustion engines. As desired, it can upon corresponding adaptation be used for the removal of gases arising in heating and/or combustion installations of any desired type in which undesired gases are produced. This is, for example, the case when burning lumber, coal, or oil.

Catalytic materials can include materials coated with platinum, rhodium, vanadium, palladium or another catalytically active or acting material, or which are combined with such materials.

It will be understood that the embodiments illustrated in the foregoing are primarily used for describing, but not as limiting the present invention. Any modification not deviating from the spirit, concept and features of the present invention is deemed as being included in the scope of the appended claims.

The embodiments of the invention in which an exclusive property or privilege is claimed are defined as follows:

1. A gas filter, suitable for removing soot from a combustion exhaust gas stream, which comprises a plurality of identically sized and shaped gas-permeable formed metal plates, each plate having a front face and a back face, each front face containing a plurality of longitudinal channels positioned between longitudinal channel-separating pieces, each channel having an open end and a closed end provided by a transverse closing cross-piece, with adjacent plates of said plurality of plates being positioned with front faces against back faces and with adjacent plates being rotated 180° with respect to each other to provide a head-to-toe arrangement of adjacent plates for providing rows of inlet channels alternating with rows of outlet channels within said gas filter.

2. A gas filter according to claim 1 further including a gas-impermeable outer shroud containing said plurality of formed plates.

3. A gas filter according to claim 1 wherein said formed plates have rectangular front and back faces.

4. A gas filter according to claim 1 wherein said formed plates comprise a catalytic metal selected from the group consisting of chromium, platinum, rhodium, vanadium, palladium, molybdenum, nickel, copper and manganese.

5. A gas filter according to claim 1 wherein each inlet channel is in longitudinal alignment with a plurality of outlet channels and each outlet channel is in longitudinal alignment with a plurality of inlet channels.

6. A gas filter according to claim 1 wherein said formed plates comprise compacted and sintered metal particulates, and said plurality of formed plates are sintered together to form a unitary filter body.

7. A gas filter according to claim 6 wherein said unitary filter body is contained within and sintered to a gas impermeable outer shroud.

8. A gas filter according to claim 1 further containing catalytically active inserts within said inlet channels.

9. A gas filter according to claim 8 wherein said catalytic inserts are wire shapes.

10. A gas filter according to claim 8 wherein said catalytic inserts are selected from the group consisting of catalytic pins, catalytic mesh, and catalytic woven wire.

11. A gas filter according to claim 1 wherein said formed plates comprise compacted and sintered metal particulates.

12. A gas filter according to claim 11 wherein said metal particulates are selected from the group consisting of metal powder, metal wire pieces and metal chips.

13. A gas filter according to claim 12 wherein said metal wire pieces or metal chips have a width of from about 0.1 mm to about 5 mm and a length of from about 0.5 mm to about 30 mm.

* * * * *